Patented Sept. 4, 1923.

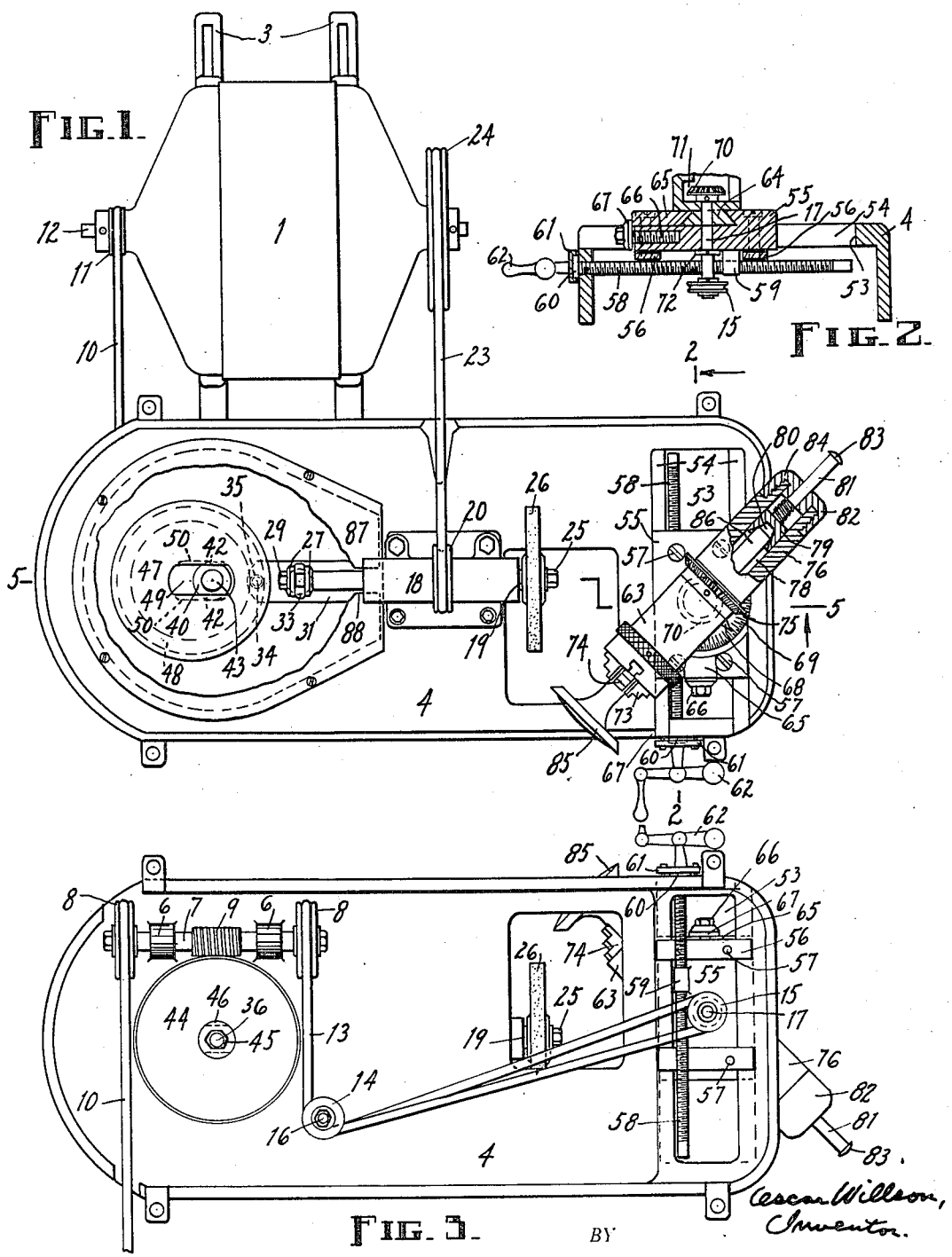

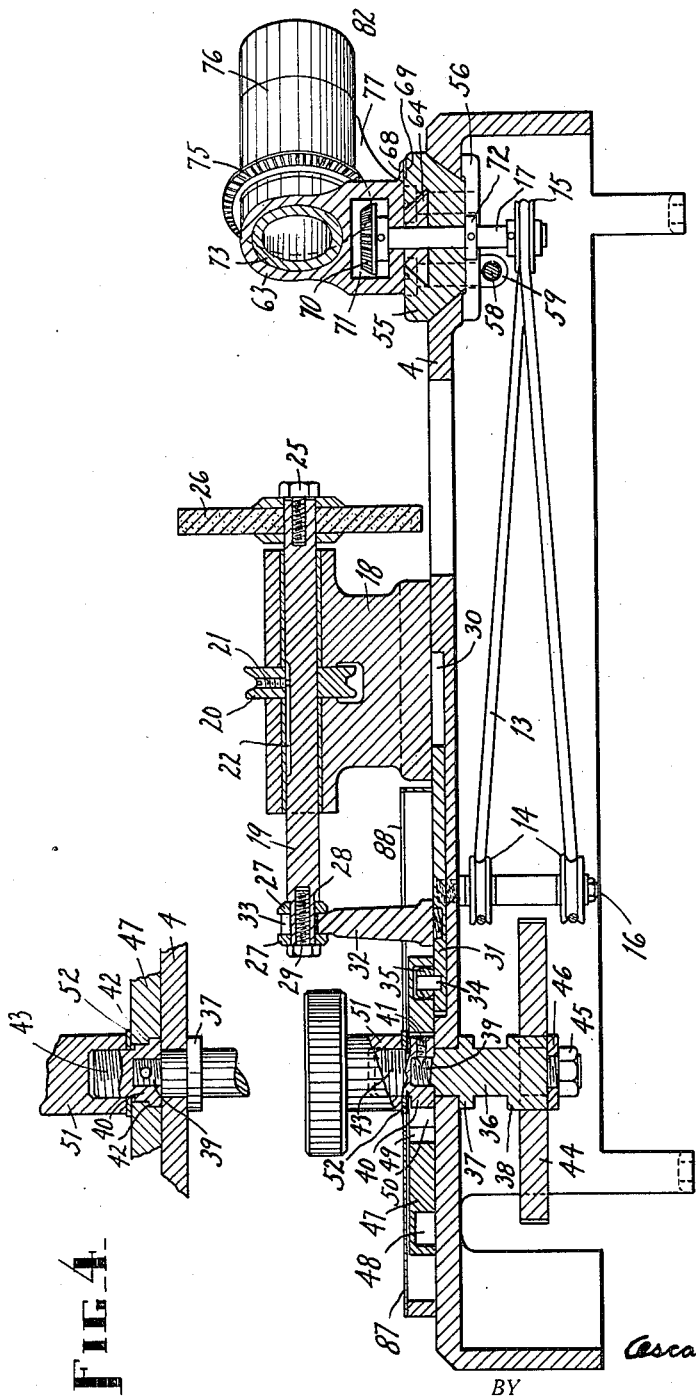

1,467,023

UNITED STATES PATENT OFFICE.

OSCAR WILLSON, OF SPRINGFIELD, MASSACHUSETTS, ASSIGNOR OF ONE-THIRD TO ESTHER E. ERICSON AND ONE-THIRD TO CARL RASK, BOTH OF SPRINGFIELD, MASSACHUSETTS.

GRINDING MACHINE.

Application filed April 17, 1922. Serial No. 553,911.

*To all whom it may concern:*

Be it known that I, OSCAR WILLSON, a citizen of the United States of America, and a resident of Springfield, in the county of Hampden and State of Massachusetts, have invented a new and useful Grinding Machine, of which the following is a specification.

My invention relates to improvements in machines for grinding valves and other objects, and resides in certain peculiar, reciprocating mechanism for the grinding-wheel shaft, driving mechanism for the chuck which holds and carries the work, and centering means for the inner or rear terminal of the work, together with such other parts and combinations of parts as may be necessary or desirable in order to render the machine complete in every respect, all as hereinafter set forth.

The primary object of my invention is to provide a comparatively simple and inexpensive machine, that is especially adapted for grinding valves, but may be used for grinding other objects, or for other purposes, in which machine the grinding-wheel has imparted thereto a reciprocating motion in addition to the usual rotary motion, so that said wheel, during the grinding operation, is carried back and forth or to and fro across the surface to be ground of the object acted on, and the work-holding and -carrying members are rotatably adjustable about the axis of the driving spindle or shaft for the work, to the end that valves and other objects can be ground accurately and expeditiously.

Another object is to provide the work head, of a machine of this character, with centering and supporting means for the inner or rear terminal of the work, thus assisting in holding said work and preventing the same from wabbling.

A further object is to provide the machine with suitable adjusting means for certain of the moving parts, including the work-holding and -carrying members of which mention has been made, whereby accuracy may be insured, and excessive and needless movement of the grinding-wheel on the line of its axis is obviated.

Other objects and advantages will appear in the course of the following description.

I attain the objects and secure the advantages of my invention by the means illustrated in the accompanying drawings, in which—

Figure 1 is a top plan of a machine which embodies a practical form of my invention, a portion of the cover over the wheel by means of which the grinding-wheel shaft is reciprocated being broken away, also a portion of the work head, and the lock-nut for such wheel being omitted; Fig. 2, a transverse, vertical section through said machine, taken on lines 2—2, looking in the direction of the associated arrow, in Fig. 1, the parts and members of the machine that would naturally appear in elevation being omitted; Fig. 3, a bottom plan of said machine; Fig. 4, an enlarged, sectional detail of the clamping means for said first-named wheel, and, Fig. 5, an enlarged, vertical section through the machine, on lines 5—5, looking in the direction of the associated arrow, Fig. 1.

Similar reference characters designate similar parts throughout the several views.

In Fig. 1, an electric motor is represented at 1, the same being mounted on a pair of arms 3 that extend rearwardly from a bed 4. This motor and the supporting arms therefor are omitted from the other views. The motor 1 has a shaft 12, with small and large pulleys 11 and 24 secured thereon at the left- and right-hand ends, respectively. The bed 4 consists of a flat plate and depending sides and ends.

Journaled in depending bearings 6—6 beneath the bed 4 is a shaft 7. Secured on the shaft 7 at each end is a pulley 8, and secured on said shaft intermediate of its ends is a worm 9. A belt 10 passes over the motor pulley 11 and the left-hand pulley 8, said last-named pulley being directly in front of said first-named pulley. Thus the shaft 7, with the worm 9 and the right-hand pulley 8, is driven from the motor 1. A belt 13 passes over the right-hand pulley 8, partly around two idlers 14, and around a pulley 15. The idlers 14 are loosely mounted on a stud 16 that depends from the bed 4 and is so located as to position said idlers behind the right-hand pulley 8. The pulley 15 is secured on a vertical shaft 17, to which further reference will hereinafter be made. The course of the belt 13 is diverted by the idlers 14 in such a manner as to enable said belt to drive the pulley 15 from the right-hand pulley 8. The pulley 15 and its shaft 17 are adjacent to the right-hand end of the bed 4.

Situated on the bed 4, approximately in the center thereof and securely bolted to said bed, is an upright 18 which affords a bearing for a horizontal shaft 19 that has its axis located in the longitudinal central plane of the machine. The upright or bearing 18 is vertically slotted to accommodate a pulley 20 which is mounted on the shaft 19. The pulley 20 is connected with the shaft 19 in such a manner, by means of a screw 21 tapped radially into said pulley, and through the medium of a longitudinal groove 22 in said shaft, as to cause said shaft to rotate with said pulley, and at the same time permit said shaft to be moved longitudinally independently of said pulley. The sides of the slot in which the pulley 20 is located prevent said pulley from being moved lengthwise of its axis. The pulley 20 is driven from the motor 1 by means of a belt 23 that passes over the motor pulley 24 and over said pulley 20.

The shaft 19 extends at both ends beyond the bearings 18, and secured on the right-hand, protruding terminal of said shaft, by means of a bolt 25, is a grinding-wheel 26.

The left-hand terminal of the shaft 19 is provided with two flanges or collars 27, the same being located between a shoulder 28 on said shaft and the head of a bolt 29 tapped into said shaft. The collars 27 are spaced apart.

A longitudinal slot 30 is made in the top of the bed 4, which slot extends part way beneath the bearing 18, and projects some distance to the left of said bearing. A slide 31 is arranged to reciprocate in the slot 30. Mounted on and secured to the slide 31 is a post 32, which post has at the top a yoke 33 adapted to receive that part of the shaft 19 that is between the collars 27, and to be received between said collars. Thus it is seen that motion imparted to the slide 31 in the slot 30 is transmitted by the post 32 to the shaft 19, and that said shaft thus imparts to the grinding-wheel 26 a reciprocating motion as well as a rotary motion, it being clear that the shaft can be moved longitudinally by said post while at the same time being rotated.

A stud 34 rises from the slide 31 at the left of the post 32, and an anti-friction roll 35 is mounted loosely on said stud.

Journaled in the bed 4 behind the worm 9 is a vertical shaft 36. The shaft 36 has a flange 37 thereon which bears against the underside of the bed 4, and said shaft also has a flange 38 below said first-named flange. At the top of the shaft 36 is a screw-threaded projection 39, and engaging said projection is a head 40, the projection being tapped into said head from the bottom, and the parts being secured by means of a screw 41 passing through one side of the head into the projection. The bottom of the head 40 rests partly on the bed 4, and thus supports the shaft 36 from above. The head 40 is flattened on the front and back sides, substantially as shown in Fig. 1, and below these flattened surfaces are two shoulders 42. A screw-threaded extension 43 rises from the top of the head 40. To all intents and purposes the shaft 36 and the head 40 are integral. The shaft 36 is also flattened on opposite sides at the lower terminal.

A worm-wheel 44 is mounted on the flattened lower terminal of the shaft 36 below the flange 38, so that said worm-wheel and said shaft rotate together, and a bolt 45 and a washer 46 are provided to hold said worm-wheel in place on said shaft. A wheel 47 is mounted on the flattened portion of the head 40 above the bed 4.

The wheel 47 has in the underside thereof an annular groove 48 to receive the roll 35 which is mounted on the slide 31, and said wheel has a central slot 49 therein, and in each side of said slot is a recess 50. The wheel 47 is placed on top of the bed 4, with the head 40 in the slot 49 and the shoulders 42 in the recesses 50. The slot 49 and the recesses 50 permit the wheel 47 to be adjusted on the head 40 so as to increase or decrease the distance between the axis of said head and the axis of the roll 35, which latter is in the groove 48, whereby the stroke imparted by said wheel to the slide 31, and therefore to the shaft 19, is correspondingly decreased or increased, and this without disconnecting said wheel rotatably from said head. After making such adjustment, it is necessary to lock the wheel 47 to the head 40, and to this end a lock-nut 51 is provided. The lock-nut 51 is tapped to receive the projection 43, and is capable of being screwed down tightly onto a washer 52 interposed between the bottom of said lock-nut and the top of the wheel 47. When the lock-nut 51 is tightened, the wheel 47 is tightly grasped between the shoulders 42 and the washer 52.

From the foregoing it is plainly to be seen that, as the wheel 47 revolves, assuming that said wheel be eccentric to the head 40, a reciprocating motion is imparted to the slide 31.

The worm-wheel 44 is in position to intermesh with the worm 9, and said worm-wheel is caused to revolve by said worm, when the latter is driven from the motor 1, and the rotary motion thus imparted to said worm-wheel is transmitted, through intervening parts, to the wheel 47, and is converted into a reciprocating movement for the slide 31, as observed above.

A transverse opening 53 is formed in the bed 4 adjacent to the right-hand end thereof, and the longitudinal edges of such opening form tracks 54 for a carriage 55, such carriage being held in place on said tracks by means of ordinary gibs 56 and gib-screws 57. The carriage 55 is actuated back and forth by means of a screw 58 mounted in the front side of the bed 4 and tapped into and through a lug 59 on the bottom of said carriage. The screw 58 is provided with a flange 60 which is located in front of the bed 4, and is held in place against the front side of said bed by means of a plate 61 that is bolted or otherwise fastened to said front side. Thus the screw 58 is held against longitudinal movement. Said screw is provided at the front end with a handle or crank 62. By means of the crank 62 and the screw 58 the carriage 55 can be actuated forwardly and rearwardly, but such movement is comparatively slight, being only a little more than sufficient to enable the required amount of material to be ground off of the work by the grinding-wheel 26, except in the setting of the carriage for work of different diameters.
Mounted on the carriage 55 is a swivel, work head 63, such head having, at the bottom of its upright part, a conical base 64 that is received in a suitable recess in the top of said carriage. A lock-bar 65 is slidingly arranged in the top of the carriage 55 to bear against one side of the base 64 and hold the same with the head 63 against rotation. A bolt 66 is tapped into the front end of the carriage 55, and said bolt has a flange 67 to bear against the front end of the lock-bar 65 to force the same tightly against the base 65. Upon loosening the bolt 66, the head 63 can be rotated for the purpose of locating the work carried thereby at the proper angle relative to the periphery of the grinding-wheel 26, said bolt being retightened after the proper adjustment has been made. To facilitate the adjustment of the head 63 on its vertical axis, said head is provided with a pointer 68, and the carriage 55 is provided with a scale 69 with which said pointer cooperates. The shaft 17 is journaled in the carriage 55 and in the vertical, axial center of the base 64 and the head 63.
A bevel-gear 70 is secured to the upper terminal of the shaft 17, in a recess 71 in the lower part of the head 63 or of the upright portion of such head. The shaft 17 is provided with a collar 72 below the carriage 55 to assist the bevel-gear 70 in holding said shaft in place.

The head 65 is provided with an ordinary chuck which is represented at 73. The jaws of the chuck 73 appear at 74. Secured to the chuck 73 is a bevel-gear 75 which intermeshes with the bevel-gear 70, the recess or opening 71 in the upright of the head 63 being extended to accommodate the lower portion of said first-named bevel-gear. The chuck 73 is, therefore, driven from the shaft 17 through the medium of the bevel-gears 70 and 75.

The rear terminal portion of the head 63, behind the bevel-gear 75, which portion may be termed an extension 76, is supported by a bracket 77 that extends upwardly and rearwardly from the vertical part of said head. The extension 76 has a longitudinal passage 78 therein, which passage is in line and communicates with the passage through the chuck 73. It is understood, of course, that the bevel-gear 75 does not interfere with these passages, inasmuch as said bevel-gear is mounted on the hollow chuck 73. In the passage 78 is a plunger 79 having at its inner end a conical recess 80. A stem 81 extends rearwardly from the plunger 79, and passes through a screw-cap 82 which is provided for the rear end of the extension 76, and said stem has at its rear end a head 83. Encircling the stem 81 between the plunger 79 and the screw-cap 82 is a spring 84. The spring 84 tends to force the plunger 79 inwardly, such movement being limited, in the absence of a piece of work in the chuck 73, by the head 83.

As an example of the work which this machine is designed to handle, a valve 85 and its stem 86 are represented. The stem 86 is inserted in the chuck 73, when the jaws 74 are open, as far as may be necessary properly to locate the valve 85 in grinding position. When the stem 86 is introduced into the chuck 73, the rear or inner end of said stem encounters the plunger 79 and forces the same rearwardly, against the resiliency of the spring 84. The chuck is now operated to tighten the jaws on the spindle 86. Meanwhile the compressed spring 84 causes the plunger 79 to center the inner end of the spindle 86, and such end is thus prevented from getting out of center or wabbling during the grinding operation.

A cover 87 is provided on the bed 4 for the wheel 47, and such cover has a slot 88 therein to accommodate the washer 52 and the post 32.

In practice, after the valve spindle 86 has been placed in position in the head 63, the carriage 55 is actuated rearwardly to the extent required to locate the valve 55 close to the path of the grinding-wheel 26, the head 63 is adjusted to position the valve 85 at the required angle, the wheel 47 is adjusted to impart to said grinding-wheel travel lengthwise of its axis sufficient to cause said grinding-wheel properly to act on the surface of said valve that is to be ground, and the motor is started. Now, as the revolving grinding-wheel 26 is actuated to and fro across the periphery of the valve 85, the carriage 55 is actuated rearwardly until said valve has been ground to the required extent, then the motor is stopped, the valve is removed from the head 63, another valve is placed in position, and the grinding operation is repeated.

When the head 63 is adjusted about the spindle 17, the bevel-gear 75 travels with said head and is partially rotated by reason of its engagement with the bevel-gear 70. The head 63 might be caused to make a complete revolution on its vertical axis, so far as the intermeshing bevel-gears 70 and 75 are concerned.

The belt 13 is sufficiently resilient to permit of the necessary movement on the part of the carriage 55, which movement is comparatively slight, as hereinbefore stated, except when changing the setting or the location of the same for objects to be ground, which objects have larger or smaller diameters as the case may be.

More or less change in the shape, size, construction, and arrangement of some or all of the parts of this machine may be made without departing from the spirit of my invention, or exceeding the scope of what is claimed.

What I claim as my invention, and desire to secure by Letters Patent, is—

1. The combination, in a grinding machine, with a rotary and reciprocating horizontal grinding-wheel shaft, and means to rotate said shaft, of a horizontal reciprocating member provided with a post in operative engagement with said shaft, and a horizontal eccentric rotary member in operative engagement with said reciprocating member.

2. The combination, in a grinding machine, with a rotary and reciprocating shaft, and means to rotate said shaft, of a slide provided with a post which is operatively connected with said shaft, and further provided with a projection, a wheel having an annular groove therein to receive said projection, a driving shaft for said wheel, and means to attach said wheel eccentrically to said last-named shaft.

3. The combination, in a grinding machine, with a rotary and reciprocating shaft, and means to rotate said shaft, of a slide provided with a post operatively connected with said shaft, and further provided with a projection, a wheel having an annular groove therein to receive said projection, and also having a slot therein, a shaft having a part receivable in said slot and adapted rotatably to connect said wheel with said last-named shaft, said wheel being adjustable lengthwise of said slot on said part, and means to lock said wheel to said part after adjustment.

4. The combination, in a grinding-machine, with a rotary and reciprocating shaft, and means to rotate said shaft, of a slide provided with a post in operative engagement with said shaft, and further provided with a projection, a wheel having therein an annular groove to receive said projection, and also having therein a slot with recessed sides, a shaft provided with a head that is receivable in said slot and adapted to carry with it rotatably said wheel, said head having projections to enter the recesses in said sides of said slot, the construction and arrangement being such that said wheel is adjustable lengthwise of said slot on said head, and a lock-nut in threaded engagement with the upper part of said head, and adapted to bind said wheel between said projections and the lock-nut.

OSCAR × WILLSON.
his mark

Witnesses:
F. A. CUTTER,
R. E. ALLBEE.